(12) United States Patent
Zhengang et al.

(10) Patent No.: US 7,778,340 B2
(45) Date of Patent: Aug. 17, 2010

(54) ACCURATE CHANNEL QUALITY INDICATOR FOR LINK ADAPTATION OF MIMO COMMUNICATION SYSTEMS

(75) Inventors: Pan Zhengang, Hong Kong Sar (CN);
Chan Wingchau, Hong Kong Sar (CN);
Zhao Xueyuan, Hong Kong Sar (CN);
Lo Chiming, Hong Kong Sar (CN);
Nejib Boubaker, Hong Kong Sar (TN)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 554 days.

(21) Appl. No.: 11/851,295

(22) Filed: Sep. 6, 2007

(65) Prior Publication Data

US 2009/0067557 A1    Mar. 12, 2009

(51) Int. Cl.
*H04K 1/10* (2006.01)
*H04L 27/28* (2006.01)

(52) U.S. Cl. .............. 375/260; 375/267; 375/299; 375/316; 375/347; 714/704

(58) Field of Classification Search ........... 375/260, 375/267, 299, 316, 347; 714/704
See application file for complete search history.

(56) References Cited

U.S. PATENT DOCUMENTS

| 6,807,154 | B1 | 10/2004 | Malmgren et al. |
| 7,116,981 | B2 | 10/2006 | Jeon et al. |
| 7,120,199 | B2 * | 10/2006 | Thielecke et al. ......... 375/267 |
| 7,161,956 | B2 | 1/2007 | Gollamudi et al. |
| 7,492,830 | B2 * | 2/2009 | Bocquet ................... 375/267 |
| 7,661,038 | B2 * | 2/2010 | Li et al. ..................... 714/704 |
| 2004/0017790 | A1 | 1/2004 | del Prado et al. |
| 2005/0070319 | A1 | 3/2005 | Pedersen |
| 2006/0034244 | A1 | 2/2006 | Huang et al. |

FOREIGN PATENT DOCUMENTS

| EP | 1802017 | 6/2007 |
| WO | WO 2006035070 | 4/2006 |

* cited by examiner

*Primary Examiner*—Ted M Wang
(74) *Attorney, Agent, or Firm*—Fulbright & Jaworski L.L.P.

(57) ABSTRACT

A method for performing link adaptation in a Multiple Input Multiple Output (MIMO) system comprises: receiving a signal at a receiving unit of the MIMO system, calculating channel state information (CSI) from the received signal, and calculating a plurality of values of a parameter from the CSI, the parameter mapping to an error rate of the system, the mapping being substantially one-to-one within a range of interest of the error rate, each one of the calculated values corresponding to one of a plurality of Modulation Coding Schemes (MCSs).

25 Claims, 10 Drawing Sheets

ACCURATE CHANNEL QUALITY INDICATOR FOR LINK ADAPTATION OF MIMO COMMUNICATION SYSTEMS

TECHNICAL FIELD

The present description is related to Multiple Input Multiple Output (MIMO) communication systems and, specifically, to link adaptation in MIMO systems.

BACKGROUND OF THE INVENTION

Multiple Input Multiple Output (MIMO) technology has been widely adopted as the key technology of the evolutions of variant wireless communication standards, such as the Institute of Electrical and Electronic Engineers (IEEE) 802.11n/802.16e, the 3rd Generation Partnership Project (3GPP) Long Term Evolution (LTE), the Third Generation Partnership Project 2 (3GPP2) Air Interface Enhancement (AIE) and so on. Systems with a single input and/or single output tend to be relative simple, such that adjustment of transmission scheme usually involves merely changing the transmitting power, modulation constellation and coding rate of one single data stream. By contrast, the adjustment of transmission scheme for MIMO systems is more complex due to one more spatial dimension introduced by deploying multiple antennas. Without loss of generality, a given MIMO transmission scheme may involve determining the number of multiple transmitted data streams, the modulation constellation and coding rate of overall data streams or each individual data stream, relative power and/or phase among different data streams, the mapping method between different data streams and different transmit antennas, etc. For consistency with terminology used in the art (for both single input single output systems), one MIMO transmission scheme is still referred to as a "Modulation and Coding Scheme" (MCS) in many other sources and also in this document, although a given MIMO transmission scheme can include more than only modulation and coding.

As a starting point, it should be noted that the wireless channel is a time-variant medium, such that its capacity at one point in time may be different than its capacity at another point in time. For example, due to changes in the environment, time varying multi-path fading, other nearby communications, and the like, the achievable data throughput of a wireless channel changes. In many systems, link adaptation technology is adopted to adjust the transmission scheme such that a higher transmitting data rate can be supported by the channel.

Such prior art link adaptation has been well understood for single input and/or single output systems. For example, one prior art solution is to track signal to noise ratio over a time period and to base link adaptation on a time-averaged measurement of that parameter. However, MIMO systems have vector/matrix valued channel state information such that scalar-valued signal to noise ratio is generally not precise enough to pick an optimal transmission scheme at a given moment. Moreover, the time period of one packet transmission of current broadband communication systems is so short that time-averaged channel state information is often "stale" by the time it is used by link adaptation systems.

BRIEF SUMMARY OF THE INVENTION

Various embodiments of the present invention are directed to systems, methods, and computer program products that use an intermediate parameter that has a one-to-one mapping to a system error rate, and this mapping relationship is also independent of channel realization. In one example embodiment, a relationship between the intermediate parameter and the system error rate is discerned through simulation and measurement. The relationship may vary between different MCSs, so some embodiments discern the relationship between system error rate and the intermediate parameter for a plurality of different modulation coding schemes.

Once the relationships are known, they can be used to map calculated values for the intermediate parameter to values of system error for each of a plurality of MCSs. In this manner, an MCS for a subsequent transmission can be selected.

Thus, in one example of operation of a MIMO system adapted according to one embodiment, a transmitter unit transmits signals to a receiver unit. The receiver unit extracts instantaneous CSI from the transmission and uses the CSI to calculate a value for the intermediate parameter for each of a plurality of modulation coding schemes. The receiver unit then uses the calculated values and the mapping relationship between the intermediate parameter and the system error rate to predict system error rates for a subsequent transmission for the plurality of MCSs. The receiver then selects an MCS for a subsequent transmission to optimize system error rate, goodput, and/or the like in view of other system parameters (e.g., available throughput and thresholds for system error rate). Various embodiments of the invention may experience increased performance over prior art systems that use time-averaged signal to noise ratio since the intermediate parameter reflects instantaneous wireless channel ability and since it maps well to system error rate regardless of the actual channel realization.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 5B is an illustration of an exemplary graph showing a relationship between FER and a time averaged SINR of the prior art;

DETAILED DESCRIPTION OF THE INVENTION

Figure 1:
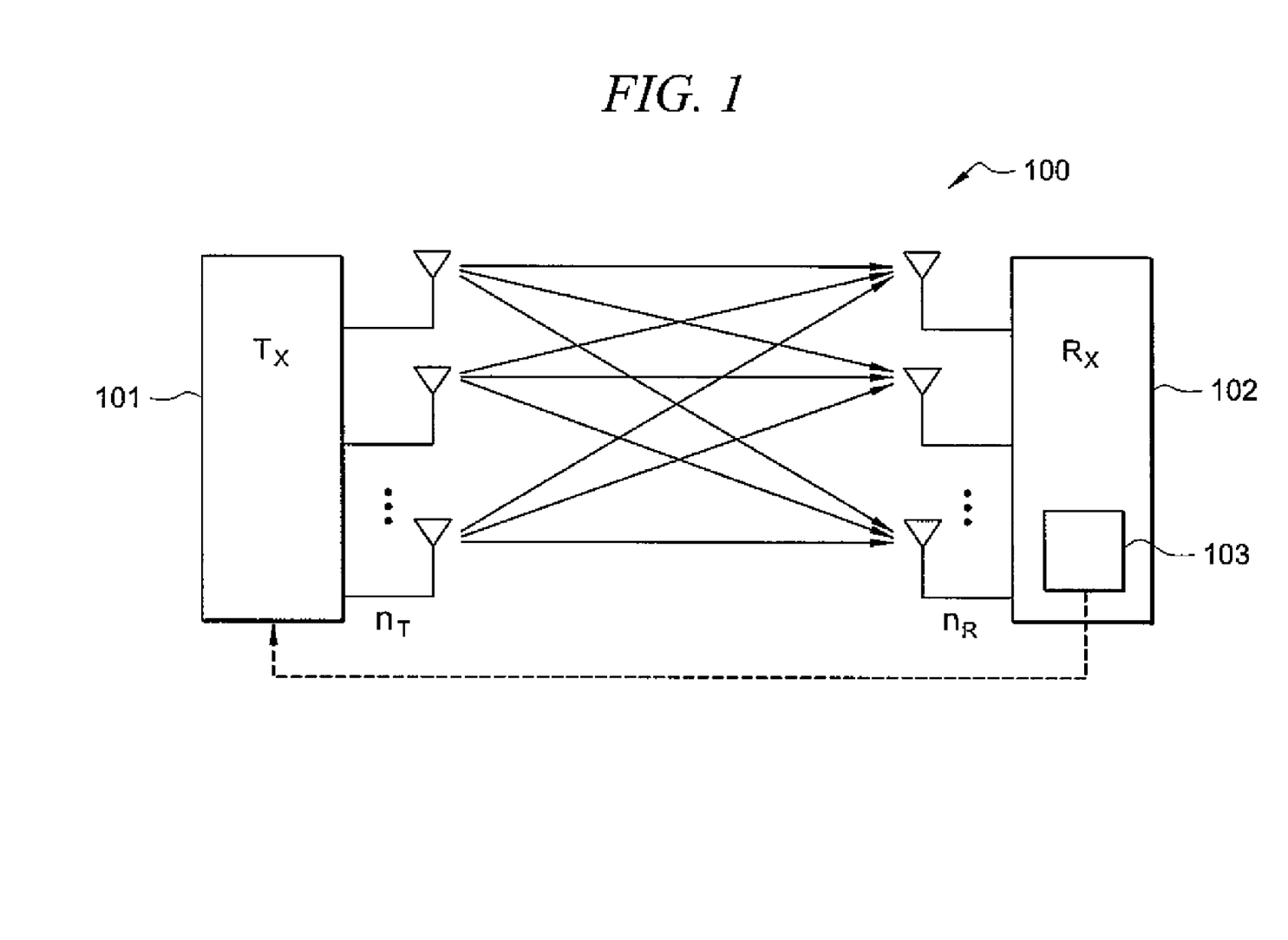
FIG. 1 is an illustration of an exemplary system adapted according to one embodiment of the invention.

FIG. 1 is an illustration of exemplary system 100 adapted according to one embodiment of the invention. System 100 includes transmitting unit 101, receiving unit 102, and link adaptor unit 103. Transmitting unit 101 has $n_T$ transmitting antennas, and receiving unit 102 has $n_R$ receiving antennas. As shown, system 100 is a Multiple Input Multiple Output (MIMO) communication system.

Receiving unit 102 receives transmitted signals from transmitting unit 101 and calculates Channel State Information (CSI) from the received signals. A variety of methodologies can be used to calculate the CSI, such as pilot-aided and blind methods, based on a variety of criteria, such as Least Square, Minimum Mean Square Error, Maximum Likelihood, and the like. Link adaptor unit 103 uses the calculated CSI to calculate a parameter from the CSI that maps to an error rate of the system. Examples of such error rates include Bit Error Rate (BER), Frame Error Rate (FER), and the like. Further, the mapping relationship is independent of any particular channel realization within a range of interest of the error rate.

Link adaptor unit 103 includes information therein that indicates a relationship between the parameter and the system error rate for a number of modulation coding schemes (MCS). Once the parameter value is calculated, an appropriate channel MCS can be selected based at least in part on the corresponding system error rates.

While link adaptor unit 103 is shown within receive unit 102, it should be noted that various embodiments of the invention are not limited thereto. In fact, the functionality of unit 103 may be provided by software and/or hardware that is distributed between transmitter 101 and receiver 102. An example of one such arrangement is shown in FIG. 2.

Figure 2:
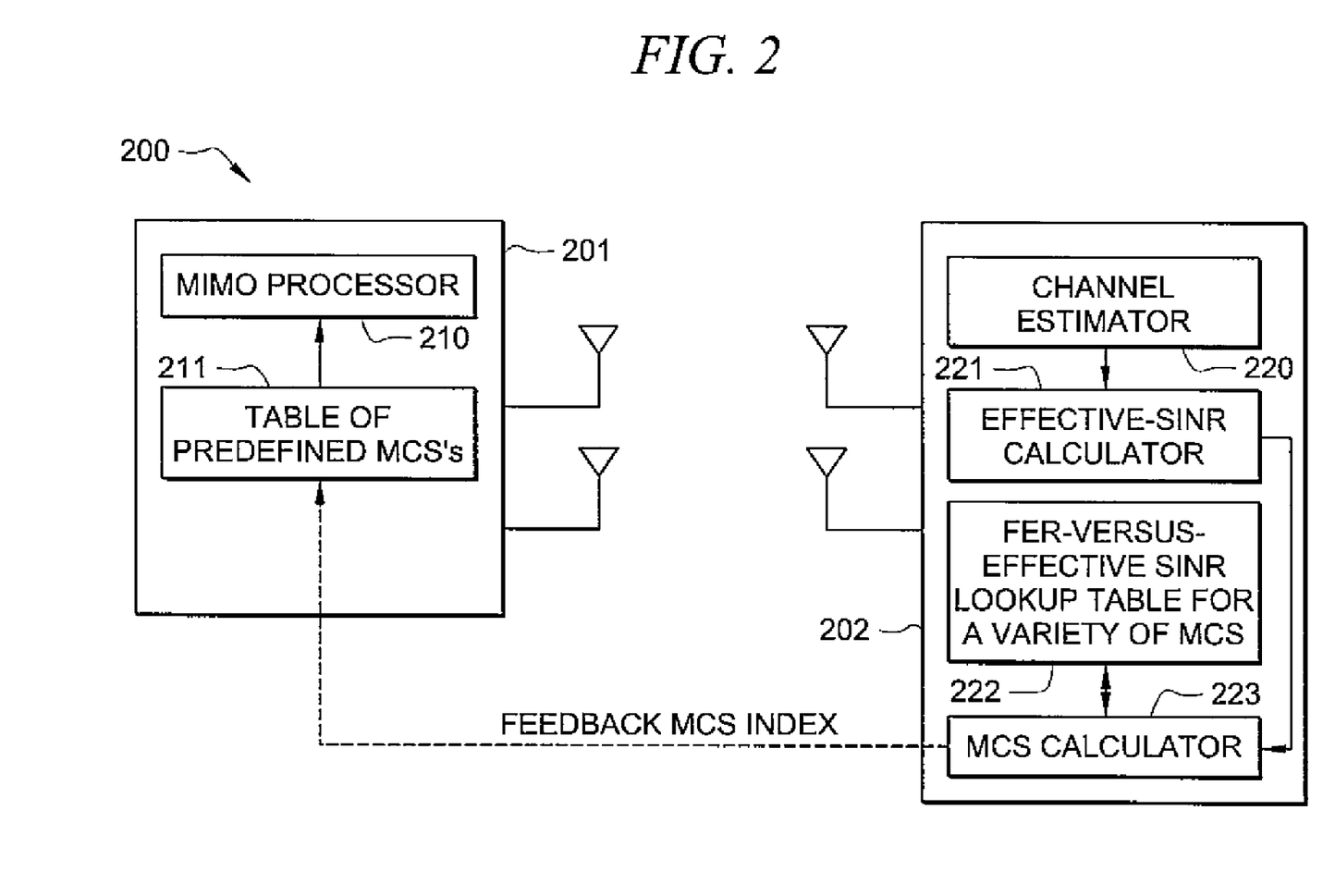
FIG. 2 is an illustration of an exemplary system adapted according to one embodiment of the invention.

FIG. 2 is an illustration of exemplary system 200 adapted according to one embodiment of the invention. System 200 in this example is a MIMO system adapted according to the IEEE 802.11n standard. Other embodiments may be directed toward different MIMO applications, such as IEEE 802.16e/m, 3GPP LTE, 3GPP2 AIE and IMT-Advanced.

System 200 includes transmitter 201 and receiver 202. Receiver 202 receives signals from transmitter 201. Inside receiver 202, channel estimator 220 calculates CSI from the transmitted signal by, e.g., calculating a signal to noise ratio and a channel matrix.

The CSI is passed to effective Signal to Interference-plus-Noise Ratio (SINR) calculator 221, which determines an effective SINR for the received transmission. Effective SINR is discussed in more detail below. In this example, effective SINR is an instantaneous measurement that has a known one-to-one mapping to the FER.

The effective SINR is passed to MCS calculator 223. MCS calculator 223 uses lookup table 222 to compare corresponding FER values for a plurality of coding schemes. MCS calculator 223 then selects one of the coding schemes to optimize one or more metrics, such as to minimize FER, to maximize goodput (throughput multiplied by (1-FER)), to satisfy an FER requirement while maximizing throughput, and/or the like. An index indicating an appropriate MCS is then passed to transmitter 201.

Transmitter 201 includes a table of pre-defined MCSs, and it uses the passed MCS index to look up the appropriate MCS. Examples of MCSs include various combinations of: number of spatial streams (1, 2, 3, or more), modulation constellation Binary Phase Shift Keying (BPSK), Quadrature Phase Shift Keying (QPSK), 16, 64, and 256 Quadrature Amplitude Modulation (QAM)), and coding rates ($\frac{1}{2}$, $\frac{2}{3}$, $\frac{3}{4}$ and more) and the like. MIMO processor 210 then applies the MCS to a subsequent signal transmission.

Figure 3:
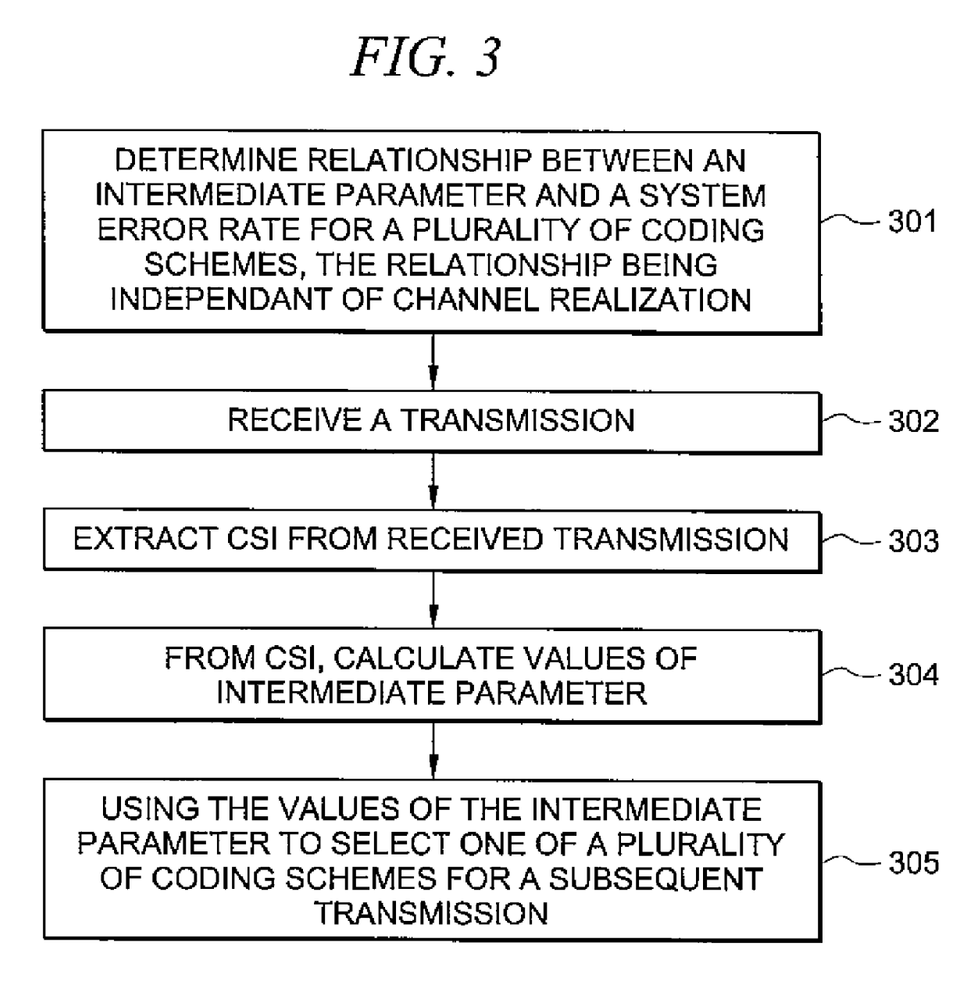
FIG. 3 is an illustration of an exemplary method adapted according to one embodiment of the invention for operating a MIMO communication system according to one embodiment of the invention.

FIG. 3 is an illustration of exemplary method 300 adapted according to one embodiment of the invention for operating a MIMO communication system. Method 300 may be performed by one or more processing units in a MIMO system or in communication with a MIMO system. In step 301, a relationship between an intermediate parameter and a system error rate for a plurality of MCSs is determined. As mentioned above, the intermediate parameter has a one-to-one mapping relationship with the system error rate, and the mapping relationship is independent of instantaneous channel realization.

In many embodiments, step 301 is performed through extensive simulation. In one example, for a known MIMO system, a system error rate (e.g., FER) is calculated for many possible channel realizations for a first MCS, using a simulation program. Then, the system error rate is calculated for many possible channel realizations for a second MCS. The user repeats this for a number of MCSs to create a first set of values that link channel realizations, MCSs, and error rate values for the known MIMO detection method.

Continuing with this example, the user also calculates values of the intermediate parameter for the various channel realizations and MCSs. In some embodiments, this step is performed using the actual MIMO detection method (e.g., a Zero-Forcing (ZF) algorithm, a Minimum Mean Square Error (MMSE) algorithm, a Vertical Bell-Labs Layered Space Time Architecture implemented (V-BLAST) algorithm, a Maximum Likelihood Detection (MLD) algorithm) so that the intermediate parameter values reflect the actual operating properties of the MIMO detection method. This creates a second set of values that link channel realizations, MCSs, and intermediate parameter values. The two sets of values are then used to create a data set that correlates the intermediate parameter with the error rate values for the MCSs. The data set can be used to create a lookup table. Additionally or alternatively to the lookup table, curve fitting operations can be used to create mathematical functions that output an error rate value when an intermediate parameter value is input (for each coding scheme, of course). Thus, during operation of the system, a calculated parameter value can be used to predict the probable system error rates for the MCSs. This process is described in more detail below.

In step 302, a packet transmitted by a MIMO scheme is received. In step 303, CSI is extracted from the transmission. In many embodiments, the CSI includes a signal power measurement, a noise power measurement, and a channel state matrix. As mentioned above with regard to FIG. 2, any of a variety of methods/algorithms can be used to extract CSI from the transmission.

In step 304, the intermediate value is calculated from the CSI for each MCS. An example process for calculating an intermediate value for a single MCS is described in more detail with regard to FIGS. 4-8A.

In step 305, the values of the intermediate parameter are used to select one of a plurality of MCSs for a subsequent transmission. In one example, there is a lookup table that correlates intermediate parameter values and error rate values for a plurality of possible MCSs. In another example, there are mathematical functions rather than a lookup table. Whether a lookup table or functions are used, the calculated intermediate parameter values provide an indication of an expected error rate for each of the possible MCSs. One of the MCSs can then be selected based, at least in part, on this expected error rate. Selected MCSs are then applied to a subsequent transmission.

In order to clarify the above discussion regarding the intermediate parameter and system error rate, the following elaboration is provided. For a given MIMO communication system, such as system 100 of FIG. 1, the operation therein can be described with a mathematical function:

$$y_k(t) = \sqrt{\frac{P}{n_T N_c}} H_k(t) x_k(t) + n_k(t) \tag{1}$$

Where $k=0, \ldots, N_c-1$, $n_k(t)$ is a noise vector, P is total normalized transmitted power, and $N_c$ is number of data subcarriers and where:

$x_k \in C^{n_T}$ Transmitted vector signed for subcarrier k
$y_k \in C^{n_R}$ Received vector signal for subcarrier k
$H_k \in C^{n_R \times n_T}$ Matrix channel for subcarrier k
$n_k \in C^{n_R}$ Received vector noise for subcarrier k with distribution $CN(0, \sigma_n^2)$ The set $$\left\{ \frac{P}{\sigma_n^2}, \{H_k\}_{k=1:N_o-1} \right\}$$

represents CSI for this case. The first term is a value representing instantaneous signal to noise ratio for a transmission. The "P" in the set is a value for transmitter power normalized to more accurately reflect the transmit power at the transmitter. In practice, the multiplication of P and H is typically observed at the receive side of a MIMO system. However, in this example, P and H are mathematically separated by assuming that the long-term expected magnitude of each element of H is 1. The normalized power is divided by noise power, represented by omega squared. The second value in the set represents the values in the channel matrix H, which are complex values giving amplitude and phase, thereby describing fading between each transmit and receive pair. For example, in a system with two transmitting antennas and two receiving antennas, the H matrix is a two by two matrix.

For a given CSI, various embodiments of the invention can select a best MCS from among a number of MCSs. In embodiments which operate according to the IEEE 802.11n standard, there are limited number of possible MCSs, such that it is possible to limit the analysis to that limited set.

There are a number of performance metrics that can be used to select one MCS from a number of MCSs. System error rates can be used as such metrics. For example, Bit Error Rate (BER) and Frame Error Rate (FER) can be used as reliable performance metrics. A decrease in a system error rate usually indicates an increase in performance, assuming everything else remains constant. Thus, one way to optimize system performance is to keep system error rates as low as possible while balancing other system constraints (bandwidth, processing capabilities, and the like).

The remainder of the discussion will focus upon finding an intermediate parameter that has a one-to-one mapping relationship with FER. However, it should be noted that other embodiments may utilize an intermediate parameter that maps to another system error rate, such as BER.

It would be desirable to calculate an instantaneous FER based on extracted CSI for a given MCS. However, it is very difficult to derive a close-form function that reliably provides FER for an input CSI. Instead, various embodiments of the invention find an intermediate scalar parameter, $g_e$, that can be derived from instantaneous CSI and which has a one-to-one mapping relationship with FER.

$$g_e = f_1\{P/\sigma_n^2, \{H_k\}_{k=1:N_c-1}\} \tag{2}$$

$$FER = f_2(g_e) \tag{3}$$

The function, $f_2$, in Equation 3 can be obtained by curve fitting, as described further below.

A value of $g_e$ is obtained for a given transmission for each MCS. As mentioned above, various embodiments of the invention select an MCS for subsequent transmissions based at least in part on the values for $g_e$. In this example, convolutional code is assumed, and the overall coding rate is denoted by "R", which usually has a value of ½, ⅔, ¾, or ⅚. The number of spatial streams in the MCS is denoted by "L", The modulation constellation for all spatial streams of this MCS is denoted by a vector notation $\Phi^A$ as defined by equation 4, where each element $\phi_l^A$ denotes the modulation constellation of each spatial stream which can be any of a variety of constellations, such as BPSK, QPSK, 16, 64, and 256 QAM, and the like.

$$\Phi^A \underline{\Delta} [\phi_1^A, \phi_2^A, \ldots, \phi_L^A] \tag{4}$$

The function, $B(\phi_l^A)$ denotes the number of bits carried by the constellation.

In this particular example, the first step after extracting the CSI from a transmission is to decompose the vector/matrix-valued CSI into resultant post-detected SINR vectors for each of the L parallel channels. In one example, H is a two-by-two matrix with fifty-two subcarriers, such that $y_k$ is given as:

$$y_k = \sqrt{\frac{P}{52 \times L}} \begin{bmatrix} h_{1,1}^k & h_{1,2}^k \\ h_{2,1}^k & h_{2,2}^k \end{bmatrix} x_k + n_k \tag{5}$$

Further, if there is no preprocessing, and if ZF is used as the spatial detection method, then the following relation gives the SINR vector for a case where L is one (Space Time Block Code is used):

$$g_1^k = \frac{P}{52} \cdot \frac{|h_{1,1}^k|^2 + |h_{2,1}^k|^2}{\sigma_n^2} \quad (6)$$

The MIMO system can be thought of as a system with a transform function given by equation 7.

$$\tilde{y}_k = \sqrt{g_1^k} x_k + n_k \quad (7)$$

The following relation gives the SINR vectors where L is two (and Space Division Multiplexing is used):

$$g_1^k = \frac{P}{104} \cdot \frac{1}{|e_2^*(H^*H)^{-1}H^*|^2 \sigma_n^2} \quad (8A)$$

$$g_1^k = \frac{P}{104} \cdot \frac{1}{|e_1^*(H^*H)^{-1}H^*|^2 \sigma_n^2} \quad (8B)$$

where $e_1 = \begin{bmatrix} 1 \\ 0 \end{bmatrix}$ and $e_2 = \begin{bmatrix} 0 \\ 1 \end{bmatrix}$ The MIMO system can be thought of as a system with a transform function given by equation 7.

$$\tilde{y}_k = \begin{bmatrix} \sqrt{g_1^k} & 0 \\ 0 & \sqrt{g_2^k} \end{bmatrix} x_k + n_k \quad (9)$$

The above-relations apply only to the case where ZF is the spatial detection method and there is no preprocessing. In other cases, the post detected SINR will be calculated in different forms. However, in either case, post-detected SINR is a function of the CSI.

Figure 4:
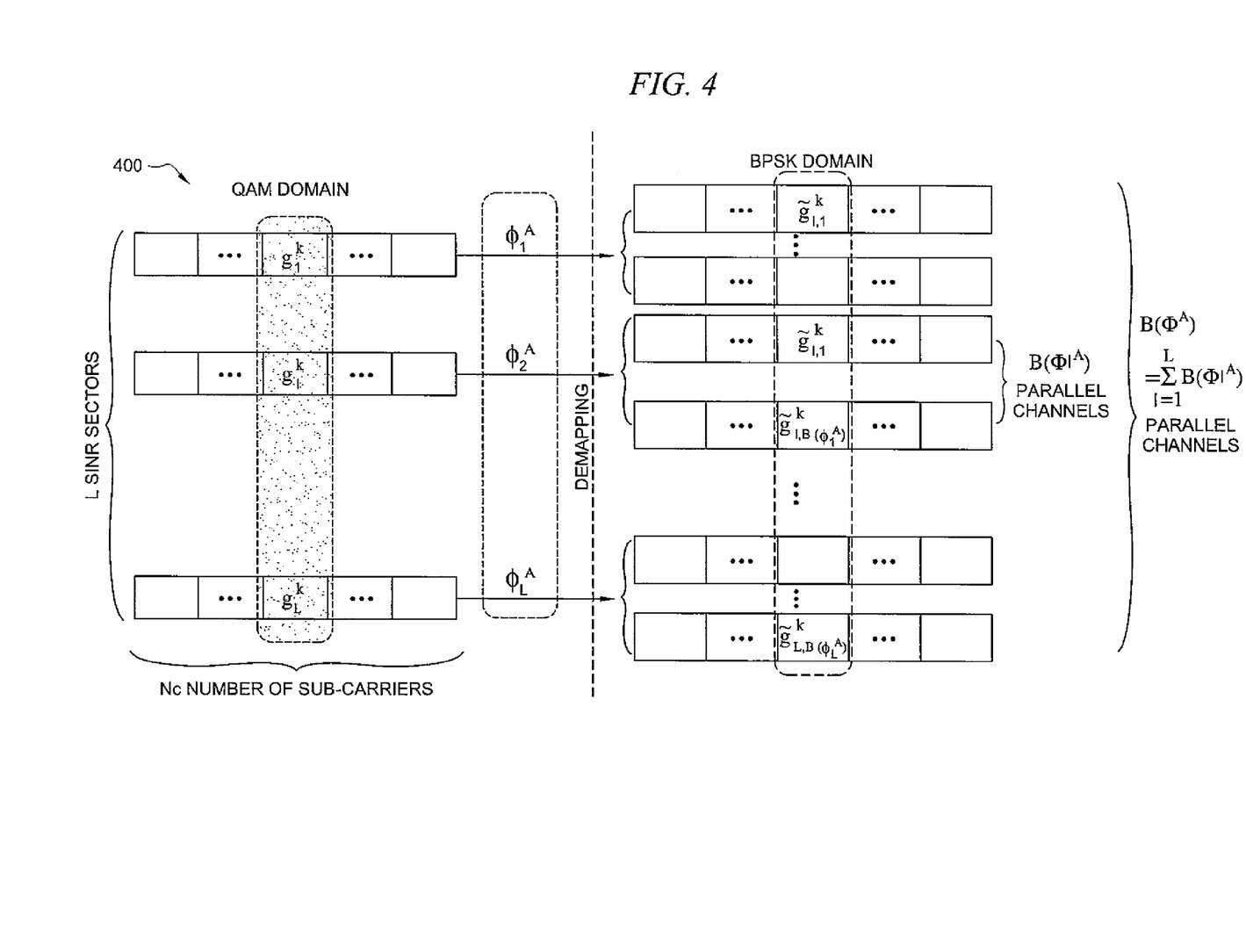
FIG. 4 is an illustration of an example process of demapping symbol-level channel gain vectors to bit-level channel gain vectors according to one embodiment of the invention.

In this example, the next step is to demap each of the L SINR vectors according to its corresponding applied constellation to break them down further into parallel channels for each bit. In the previous step, each of the L vectors gives SINR for a QAM symbol. This step involves finding the SINR for each of the bits in each of the L symbols. In one example, a 16QAM symbol includes 4 bits, such that a SINR vector for a 16QAM symbol is demapped into four vectors—one for each bit. It should be noted that BPSK is a QAM technique that treats each bit individually, such that this step is moot for vectors of BPSK symbols. FIG. 4 shows an overview of this step as process 400.

The step shown in FIG. 4 can be performed in at least two different ways. The first technique is to create a lookup table of SINR values versus BER for each of the possible constellations. Such a table can be created by extracting the data shown in FIG. 5 as graph 500. The table can be used to map a SINR value in one QAM constellation to a SINR value in BPSK. Simple curves, similar to those shown in FIG. 5, can be used for storage reservation.

Figure 5:
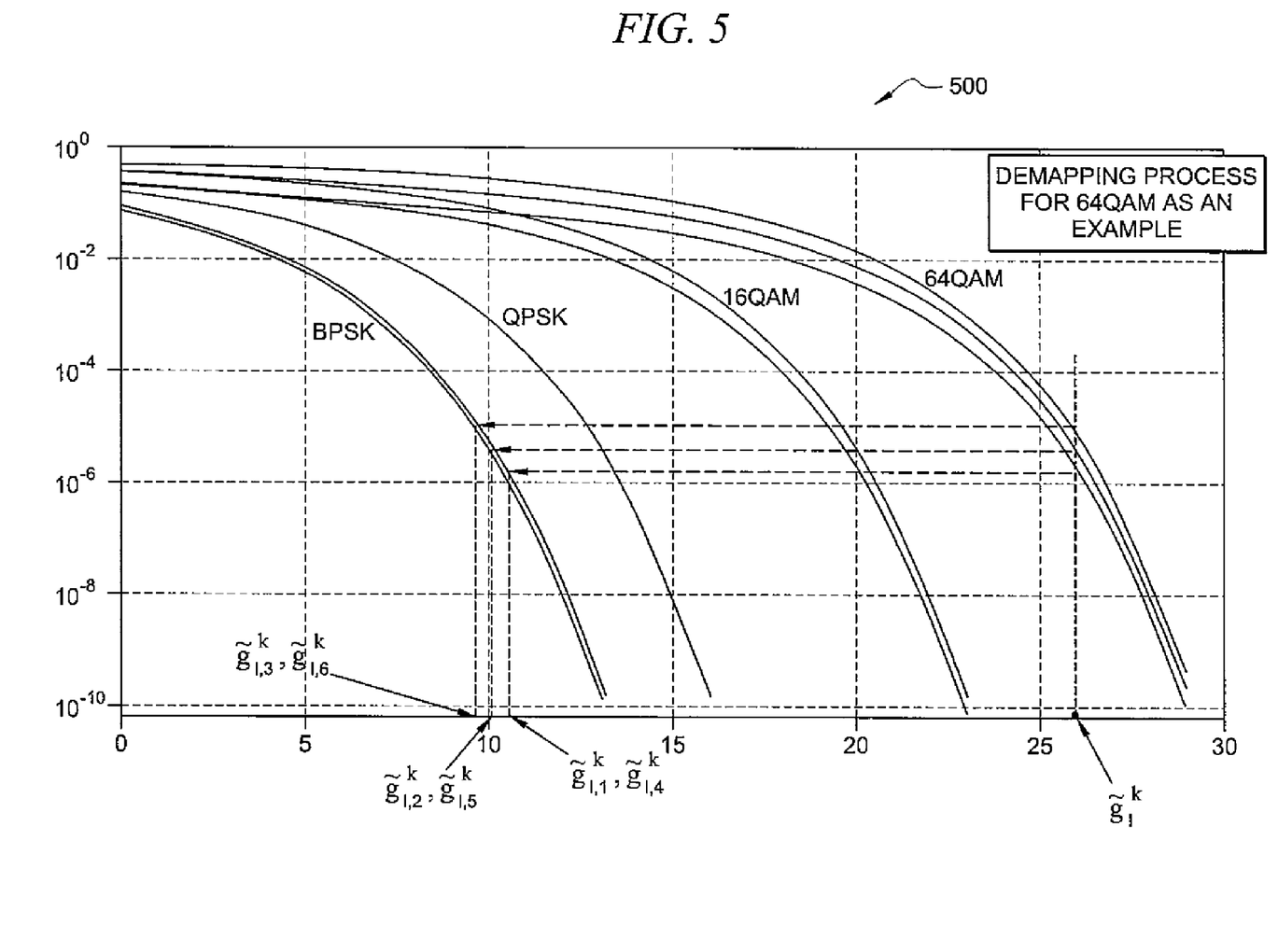
FIG. 5 is an illustration of an example relationship for demapping between symbol-level channel gain (e.g., 64QAM, 16QAM, QPSK) and bit-level channel gain according to one embodiment of the invention.
Figure 6:
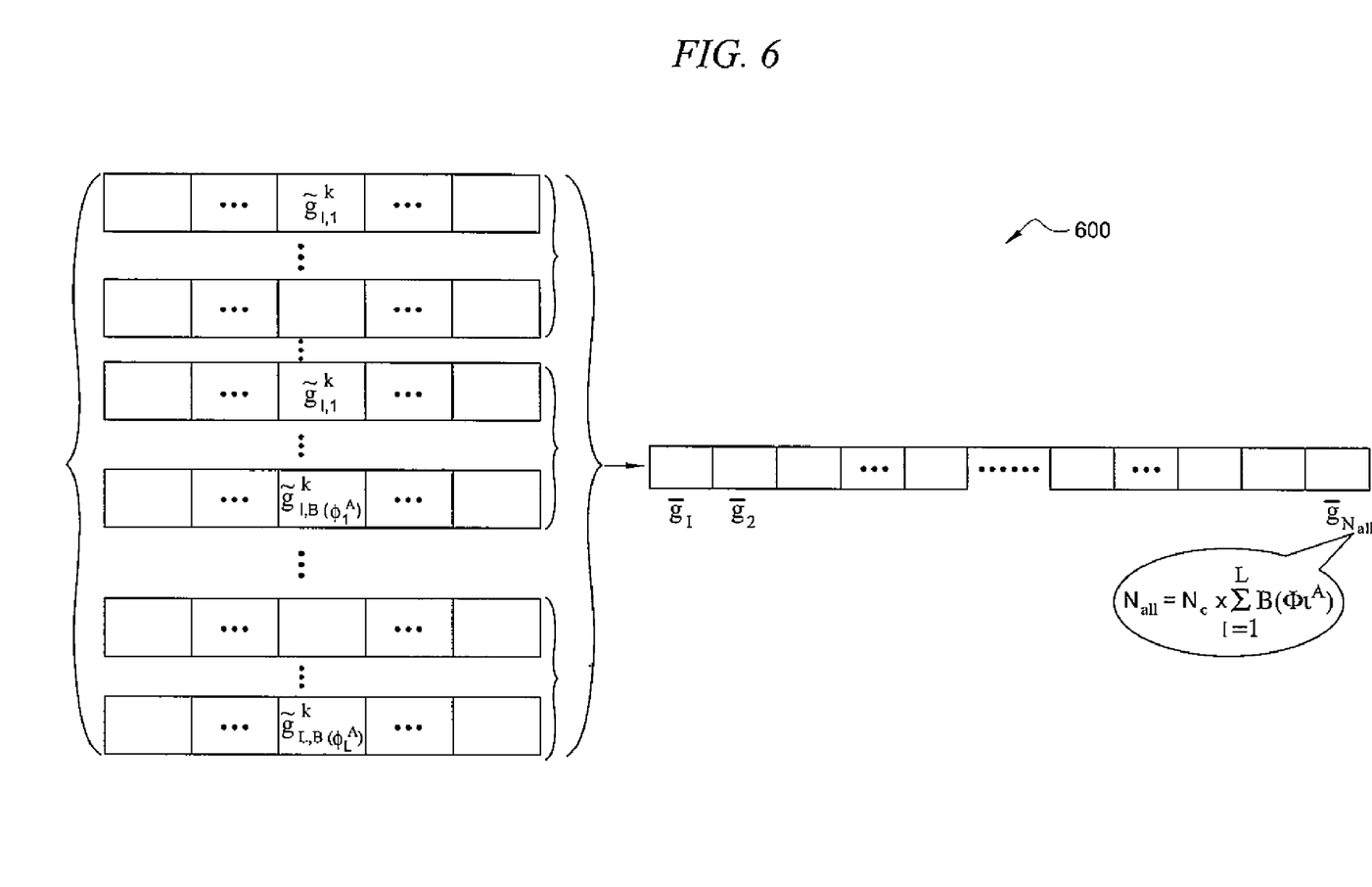
FIG. 6 is an illustration of an example process for reordering each individual element of bit-level channel gain vectors according to system interleaver design according to one embodiment of the invention.

The second technique is to use mathematical formulas, such as the ones shown below:

$$\text{if } \phi_l^A = BPSK, \text{ then } \tilde{g}_{l,1}^k = g_l^k \quad (10)$$

$$\text{if } \phi_l^A = QPSK, \text{ then } \tilde{g}_{l,1}^k = \tilde{g}_{l,2}^k = \frac{1}{2} g_l^k \quad (11)$$

-continued $$\text{if } \phi_l^A = 16QAM, \quad \binom{12 \text{ and } 13,}{\text{respectively}}$$
then $$\tilde{g}_{l,1}^k = \tilde{g}_{l,3}^k = \frac{1}{2} Q^{-1} \left\{ \frac{1}{2} \sum_{i=1}^{2} Q\left( \sqrt{\frac{(2i-1)^2}{5} g_l^k} \right) \right\}$$

and $$\tilde{g}_{l,2}^k = \tilde{g}_{l,4}^k$$

$$= \frac{1}{2} Q^{-1} \left\{ \begin{array}{l} Q\left( \sqrt{\frac{1}{5} g_l^k} \right) + \\ \frac{1}{2} \sum_{i=2}^{3} (-1)^i Q\left( \sqrt{\frac{(2i-1)^2}{5} g_l^k} \right) \end{array} \right\}$$

$$\text{if } \phi_l^A = 64QAM, \quad (14)$$
then $$\tilde{g}_{l,1}^k = \tilde{g}_{l,4}^k = \frac{1}{2} Q^{-1} \left\{ \frac{1}{4} \sum_{i=1}^{4} Q\left( \sqrt{\frac{(2i-1)^2}{21} g_l^k} \right) \right\}$$

and $$\tilde{g}_{l,2}^k = \tilde{g}_{l,5}^k = \frac{1}{2} Q^{-1} \left\{ \begin{array}{l} \frac{1}{2} \sum_{i=1}^{2} Q\left( \sqrt{\frac{(2i-1)^2}{21} g_l^k} \right) + \\ \frac{1}{4} \sum_{i=3}^{4} Q\left( \sqrt{\frac{(2i-1)^2}{21} g_l^k} \right) - \\ \frac{1}{4} \sum_{i=5}^{6} Q\left( \sqrt{\frac{(2i-1)^2}{21} g_l^k} \right) \end{array} \right\} \quad (15)$$

and $$\tilde{g}_{l,3}^k = \tilde{g}_{l,6}^k \quad (16)$$

$$= \frac{1}{2} Q^{-1} \left\{ \begin{array}{l} Q\left( \sqrt{\frac{1}{21} g_l^k} \right) + \\ \frac{3}{4} \sum_{i=2}^{3} (-1)^i Q\left( \sqrt{\frac{(2i-1)^2}{21} g_l^k} \right) - \\ \frac{2}{4} \sum_{i=4}^{5} (-1)^i Q\left( \sqrt{\frac{(2i-1)^2}{21} g_l^k} \right) + \\ \frac{1}{4} \sum_{i=6}^{7} (-1)^i Q\left( \sqrt{\frac{(2i-1)^2}{21} g_l^k} \right) \end{array} \right\}$$

Once bit-level SINR vectors are created, the next step in this example is to rearrange the individual elements in the vectors according to the interleaver design of the given MIMO communication system. For instance, a given MIMO system may not modulate the bits from first-to-last for the entire transmission, but may instead interleave the order. In this step, the bit-level SINR vectors are arranged according to the modulation order of the system. This step is shown as process 600 in FIG. 6.

Figure 7:
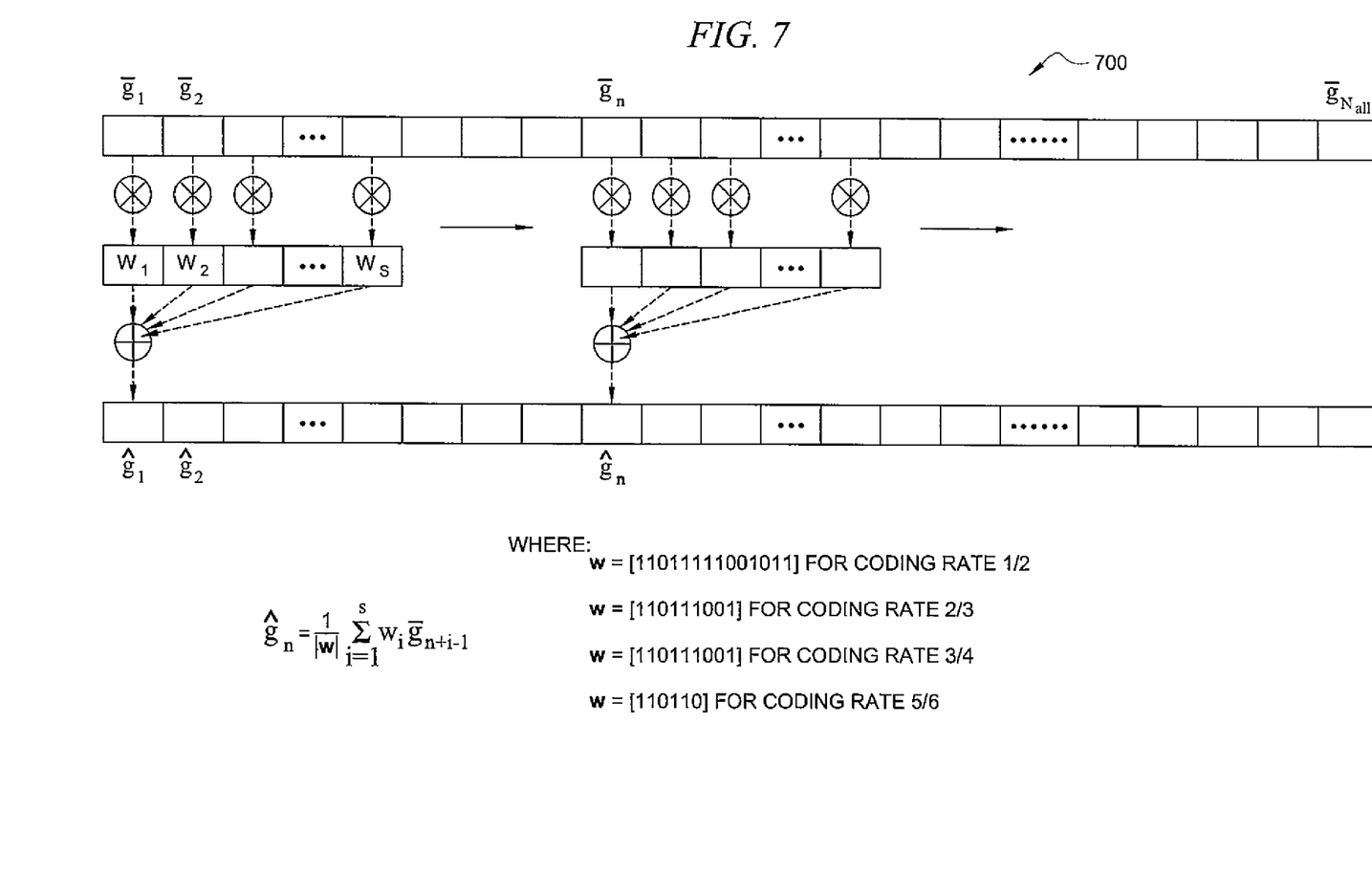
FIG. 7 is an illustration of an example process for smoothing vectors according to one embodiment of the invention.

In the next step, the reordered SINR vectors are smoothed. There are at least two ways to perform this step. In the first technique, a sliding averaging window is used across the reordered vectors to create another set of averaged vectors. One example is shown as process 700 of FIG. 7. Mathematically, it can be expressed as in equation 17, where the sliding window can be chosen, for example, according to different encoding structure of the convolutional code as stated in FIG. 7 for 802.11n.

$$\hat{g}_n = \frac{1}{|w|} \sum_{i=1}^{s} w_i \bar{g}_{n+i-1} \quad (17)$$

The smoothed vectors can then be used to obtain $g_e$, as shown in the equation below:

$$g_e = -\frac{1}{|w|} \ln\left\{ \frac{1}{N_{all}} \sum_{n=1}^{N_{all}} e^{-\hat{g}_n \times |w|} \right\} \quad (18)$$

In this example, the purpose of the smoothing is to emulate the decoding process of the convolutional code. However, according to a second technique, it can be removed for simplification purpose and/or for other coding schemes by directly calculating $g_e$ using equation 19. In equation 19, $\alpha$ is a fine tuning factor to emulate the smoothing process. The optimal value of $\alpha$ can be obtained through, e.g., computer simulation.

$$g_e = -\frac{1}{\alpha} \ln\left\{ \frac{1}{N_c \times \sum_{l=1}^{L} B(\phi_l^A)} \sum_{k=0}^{N_c-1} \sum_{l=1}^{L} \sum_{b=1}^{B(\phi_l^A)} e^{-\alpha \tilde{g}_{l,b}^k} \right\} \quad (19)$$

Whether or not using smoothing, the result is a scalar value, $g_e$, which represents an effective SINR for the transmission for a single MCS. The parameter, $g_e$, is an intermediate parameter between the CSI and system error rate (in this example, FER). In embodiments that already have information mapping $g_e$ values to FER values for the plurality of modulation coding schemes, the value for $g_e$ can then be used to select an appropriate modulation coding scheme.

In embodiments wherein the mapping relationship between $g_e$ and FER is unknown, the mapping relationships $f_2$ can be obtained through offline computer simulation. In such a scenario, one way to proceed is to use computer simulation to simulate a value of FER for a given MCS for this given CSI (signal to noise ratio and channel matrix). Then, a value for $g_e$ can also be calculated for this CSI. Then another round of simulation is made with the same MCS and with a different transmit power to simulate another value of FER, and its extracted CSI is used to calculate another value for $g_e$. This is repeated many times for the channel matrix and is repeated for numerous other channel matrices. This process is repeated for a plurality of possible MCSs.

Figure 8A:
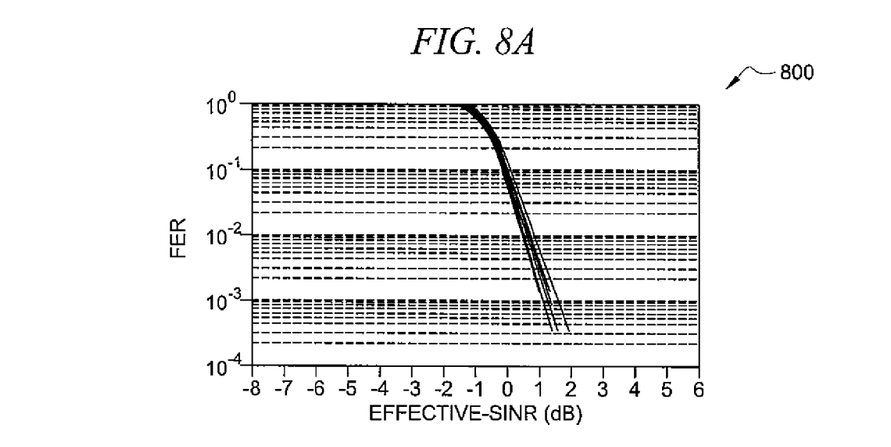
FIG. 8A is an illustration of an exemplary graph showing a relationship between FER and an intermediate parameter according to one embodiment of the invention.

The user should then have a set of values that show a relationship between $g_e$ and CSI for the MCSs and another set of values that show a relationship between FER and CSI for the MCSs. The data can be merged to give a data set that shows the relationship of $g_e$ to FER for the MCSs. An example of such a data set is shown in FIG. 8A, wherein graph 800 shows the relationship between $g_e$ and FER for one particular MCS for one particular MIMO communication system with different channel matrices.

In graph 800, each of the individual curves corresponds to a channel realization (i.e., a transmission with a particular channel matrix) at different signal to noise ratios. The closeness of the different lines in the curve indicates that the relationship between FER and $g_e$ is substantially independent of channel realization. That is, for the range of interest of FER, there is 1 dB or less of deviation in the $g_e$ values between the different channel realizations. Further, the tight curve (i.e., less than one dB deviation) in graph 800 also shows that the relationship between FER and $g_e$ is substantially one-to-one.

The curve of graph 800 can be used to derive $f_2$ of equation 3, above. For example, a curve-fitting algorithm using a Least Means Squared (LMS) technique can calculated $f_2$ from the points in graph 800. Alternatively or additionally, the data in graph 800 can be used to create a lookup table.

Prior art systems often use average SINR over time as a proxy for FER when performing link adaptation. However, because of the nearly constant change of the channel matrix in a MIMO system, time averaged SINR usually performs less well than the $g_e$ parameter shown above.

Figure 8B:
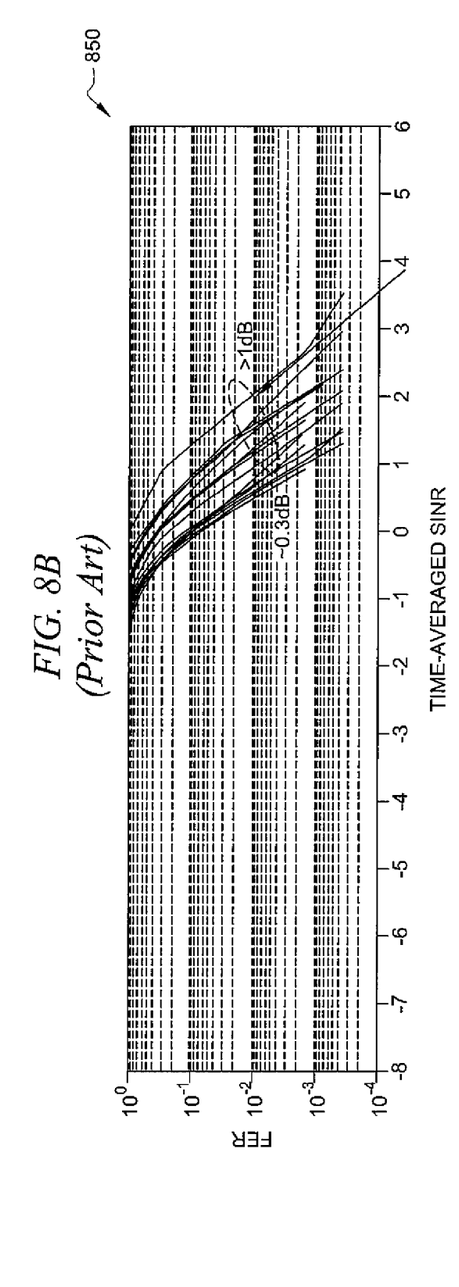

FIG. 8B includes graph 850, showing a relationship between time-averaged SINR for the same MIMO system and MCS as in FIG. 8A. As can be seen, a deviation of more than one dB in SINR value for a range of less than 0.3 dB of FER is present. In fact, the maximum deviation for the range of FER in graph 850 is over two dB. This illustrates that time-averaged SINR is quite dependent on channel realization, and that there is not a one-to-one mapping relationship. As a consequence, time-averaged SINR is a much less precise intermediate parameter than is $g_e$. Another factor that makes $g_e$ a much more precise intermediate parameter is that it is based on instantaneous CSI and, therefore, is generally very relevant for transmissions that occur in the next few transmission cycles.

Figure 9:
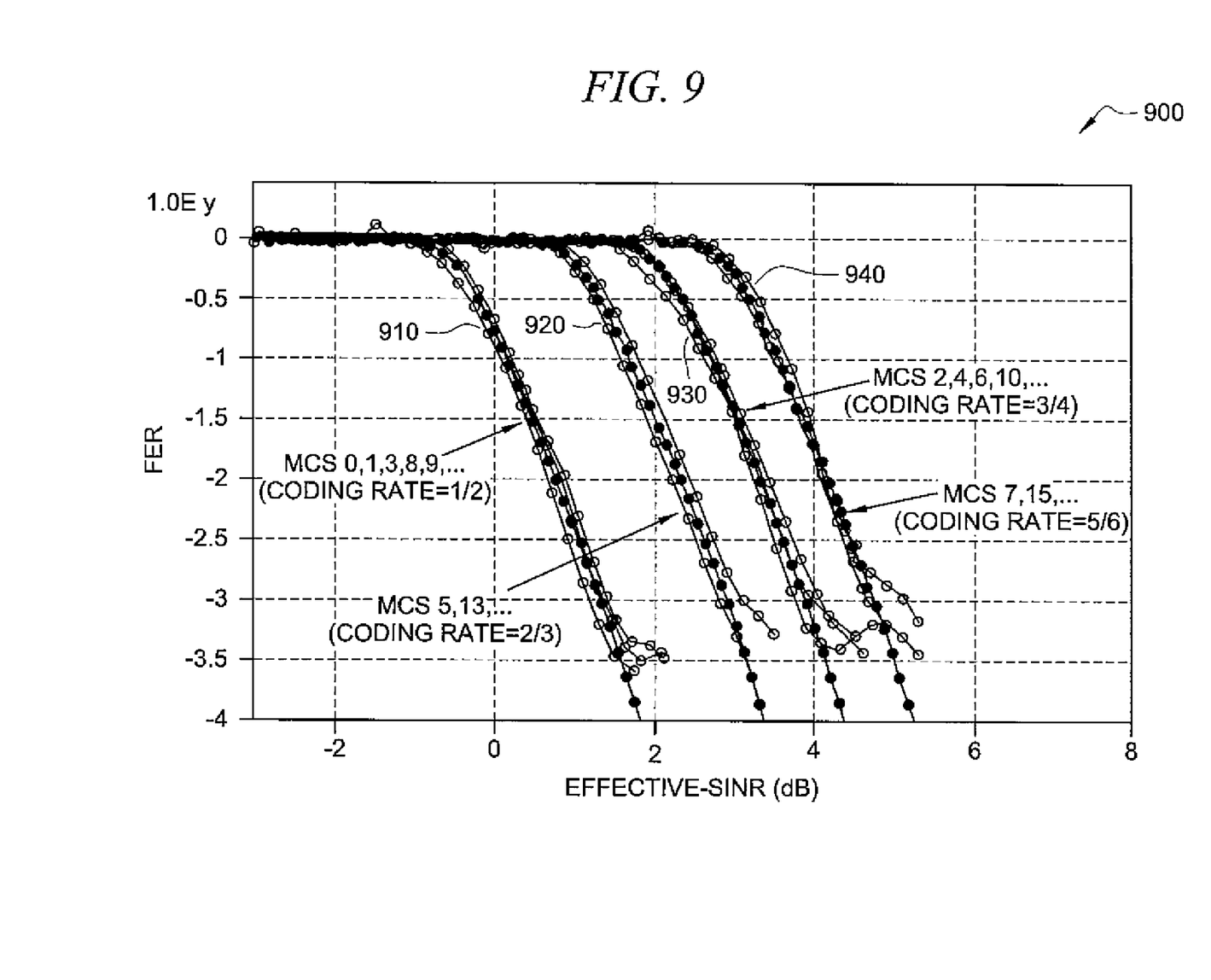
FIG. 9 is an illustration of an exemplary graph showing a relationship between FER and an intermediate parameter for a plurality of modulation coding schemes according to one embodiment of the invention.

For many embodiments, the function $f_2$ is approximately the same for different MCSs that have the same coding rate. This relationship is shown in FIG. 9, which includes graph 900 for an example MIMO communication system. While there is some amount of deviation in each of curves 910, 920, 930, and 940, the FER/$g_e$ relationship is more affected by coding rate than by other properties of the respective MCSs.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like). In fact, readable media can include any medium that can store or transfer information.

Figure 10:
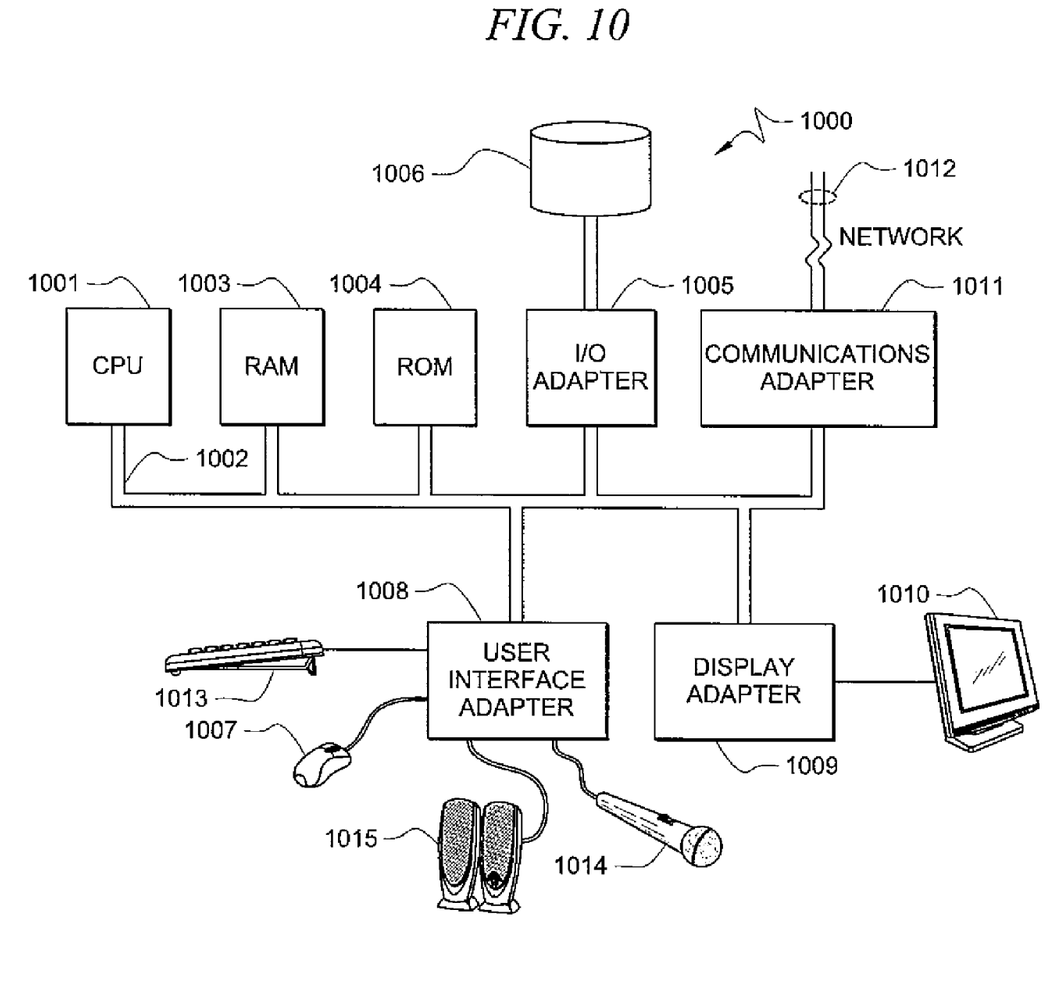
FIG. 10 is an illustration of an exemplary computer system adapted according to an embodiment of the present invention.

FIG. 10 illustrates an example computer system 1000 adapted according to embodiments of the present invention. That is, computer system 1000 comprises an example system on which embodiments of the present invention may be implemented. Central processing unit (CPU) 1001 is coupled to system bus 1002. CPU 1001 may be any general purpose CPU. However, the present invention is not restricted by the architecture of CPU 1001 as long as CPU 1001 supports the inventive operations as described herein. CPU 1001 may execute the various logical instructions according to embodiments of the present invention. For example, CPU 1001 may execute machine-level instructions to implement part or all of each of the processes shown in FIGS. 3, 4, 6, and 7.

Computer system 1000 also preferably includes random access memory (RAM) 1003, which may be SRAM, DRAM, SDRAM, or the like. Computer system 1000 preferably includes read-only memory (ROM) 1004 which may be PROM, EPROM, EEPROM, or the like. RAM 1003 and ROM 1004 hold user and system data and programs, as is well known in the art.

Computer system 1000 also preferably includes input/output (I/O) adapter 1005, communications adapter 10111, user interface adapter 1008, and display adapter 1009. I/O adapter 1005, user interface adapter 1008, and/or communications adapter 1011 may, in certain embodiments, enable a user to interact with computer system 1000 in order to input information, such as instructions to perform simulations and calculations to derive $f_2$.

I/O adapter 1005 preferably connects to storage device(s) 1006, such as one or more of hard drive, compact disc (CD) drive, floppy disk drive, tape drive, etc. to computer system 1000. The storage devices may be utilized when RAM 1003 is insufficient for the memory requirements associated with storing data for relationships between CSI, FER, and $g_e$. Communications adapter 1011 is preferably adapted to couple computer system 1000 to network 1012. User interface adapter 1008 couples user input devices, such as keyboard 1013, pointing device 1007, and microphone 1014 and/or output devices, such as speaker(s) 1015 to computer system 1000. Display adapter 1009 is driven by CPU 1001 to control the display on display device 1010 to, for example, display a user interface or to display graphs (such as that of FIG. 5, 8A, or 9) of embodiments of the present invention.

It shall be appreciated that the present invention is not limited to the architecture of system 1000. For example, any suitable processor-based device may be utilized, including without limitation personal computers, laptop computers, handheld computing devices, computer workstations, and multi-processor servers. Moreover, embodiments of the present invention may be implemented on application specific integrated circuits (ASICs) or very large scale integrated (VLSI) circuits. Further, many embodiments will include the processor-based systems in one or more transmitters and receivers, such as, e.g., a processor-based device in an IEEE 802.11n wireless access point. In the same example, processing on the receiving end may be performed by a personal computer when the receiver physical structure is a computer peripheral, such as a computer card or Universal Serial Bus (USB) device. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for performing link adaptation in a Multiple Input Multiple Output (MIMO) system, said method comprising:
    receiving a signal at a receiving unit of said MIMO system;
    extracting channel state information (CSI) from said received signal;
    calculating a plurality of values of a parameter from said CSI, said parameter mapping to an error rate of said system, said mapping being substantially one-to-one within a range of interest of said error rate, each one of said calculated values corresponding to one of a plurality of Modulation Coding Schemes (MCSs).

2. The method of claim 1 wherein said substantially one-to-one mapping relationship corresponds to a maximum deviation of one decibel within said range of interest.

3. The method of claim 1 wherein said parameter comprises a measurement of instantaneous Signal to Interference-plus-Noise Ratio (SINR).

4. The method of claim 3 wherein calculating one of said values comprises:
    decomposing a matrix of CSI into parallel spatial channels; and
    calculating a first set of SINR vectors from said decomposed CSI matrix.

5. The method of claim 4, further comprising:
    demapping said first set of SINR vectors into a second set of SINR vectors reflecting values for individual bits of said transmitted signal.

6. The method of claim 5 further comprising:
    rearranging elements of said second set of SINR vectors according to a data processing order of said MIMO system to create a rearranged SINR vector.

7. The method of claim 6 further comprising:
    non-linearly averaging values in said rearranged SINR vector, to generate a scalar value representing an effective, instantaneous SINR for said MIMO system for one of said MCSs.

8. The method of claim 6 further comprising:
    smoothing values in said rearranged SINR vector to create a smoothed SINR vector; and
    non-linearly averaging values in said smoothed SINR vector to generate a scalar value representing an effective, instantaneous SINR for said MIMO system for one of said MCSs, said scalar value comprising one of said calculated parameter values.

9. The system of claim 8 further comprising:
    predicting a system error rate value for each of said MCSs of said plurality of MCSs based, at least in part, on said calculated parameter values;
    comparing said system error rate values; and
    determining an optimal MCS of said plurality of MCSs based on said error rate.

10. The method of claim 1 wherein said extracting CSI comprises:
    determining instantaneous CSI for said transmitted signal.

11. The method of claim 1 further comprising:
    determining an optimal MCS of said plurality of MCSs based on said calculated parameter.

12. The method of claim 10 further comprising:
    applying said determined, optimal MCS to a subsequent signal transmission of said MIMO system.

13. The method of claim 1 wherein said mapping relationship is substantially independent of channel realization within the range of interest of said error rate.

14. A Multiple Input Multiple Output (MIMO) system comprising:
    a transmitting unit transmitting signals;
    a receiving unit receiving the transmitted signals and extracting channel state information (CSI) therefrom; and
    link adaptation unit calculating values of a parameter from said CSI, each of said values corresponding to a Modulation Coding Schemes (MCS), said parameter having a known and predictable relationship with an error rate of said system, said relationship being independent of channel realization.

15. The system of claim 14 wherein said link adaptation unit further obtains values of said error rate from said parameter values and selects an MCS for a subsequent signal transmission based on said determined error rate values.

16. The system of claim 15 wherein said link adaptation unit sends a message to said transmitting unit indicating said selected MCS.

17. The system of claim 16 wherein said transmitting unit applies said MCS to said subsequent signal transmission.

18. The system of claim 14 wherein said link adaptation unit is disposed in said transmitting unit.

19. The system of claim 14 wherein said link adaptation unit is disposed in said receiving unit.

20. The system of claim 14 wherein said link adaptation unit is disposed partly in said transmitting unit and partly in said receiving unit.

21. The system of claim 14 wherein said parameter has a one-to-one mapping relationship with said error rate.

22. The system of claim 14 wherein said link adaptation unit uses said calculated parameter values to select an MCS from among a plurality of MCSs, and said transmitting unit applies said selected MCS to a subsequent signal transmission.

23. The system of claim 14 wherein said parameter comprises a measurement of instantaneous Signal to Interference-plus-Noise Ratio (SINR).

24. A computer program product having a computer readable medium having computer program logic recorded thereon, said computer program product comprising:
    code, when executed by a computer, extracting channel state information (CSI) from received signals in a Multiple Input Multiple Output (MIMO) system;
    code, when executed by a computer, calculating values of an intermediate parameter from said CSI, said intermediate parameter having a one-to-one mapping relationship with system Frame Error Rate (FER);
    code, when executed by different a computer, selecting an MCS for a subsequent signal transmission from a list of MCSs, said selecting performed by obtaining a value for FER for each of said MCSs in said list, using said intermediate parameter values.

25. The computer program product of claim 24 further comprising:
    code, when executed by a computer, sending a signal to a transmitter indicating said selected MCS; and
    code, when executed by a computer, applying said MCS to said subsequent transmission in response to said indicating signal.

* * * * *

UNITED STATES PATENT AND TRADEMARK OFFICE
CERTIFICATE OF CORRECTION

PATENT NO. : 7,778,340 B2
APPLICATION NO. : 11/851295
DATED : August 17, 2010
INVENTOR(S) : Pan Zhengang et al.

It is certified that error appears in the above-identified patent and that said Letters Patent is hereby corrected as shown below:

Column 5, Line 53, delete that portion of the equation reading "$N_o\text{-}1$" and replace with --$N_c\text{-}1$--.

Column 7, Line 29, Equation (9), delete that portion of the equation reading " $\sqrt{g^k}$ " and replace with -- $\sqrt{g_1^k}$ --.

Column 10, Line 6, delete the portion of text reading "derive $f_2$" and replace with --derive $f_2$--.

Column 10, Line 8, delete the portion of text reading "calculated $f_2$" and replace with --calculated $f_2$--.

Column 10, Line 67, delete the portion of text reading "communications adapter 10111" and replace with --communications adapter 1011--.

Signed and Sealed this

Twelfth Day of October, 2010

David J. Kappos
*Director of the United States Patent and Trademark Office*